Figure 1:
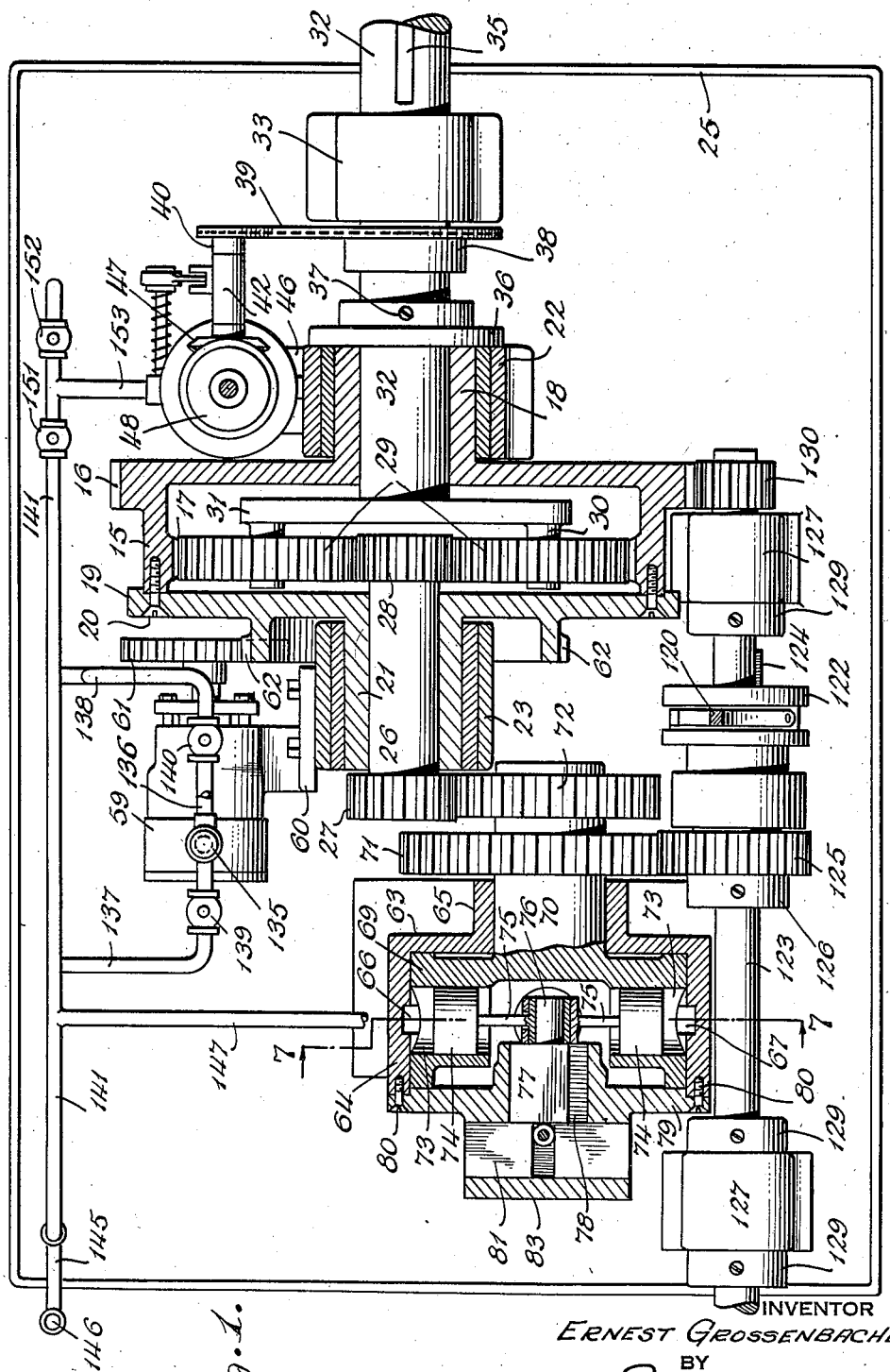

June 9, 1942.  E. GROSSENBACHER  2,285,431
VARIABLE SPEED APPARATUS
Filed July 19, 1939   5 Sheets-Sheet 1

INVENTOR
ERNEST GROSSENBACHER
BY
John A. Kehlenbeck
ATTORNEY

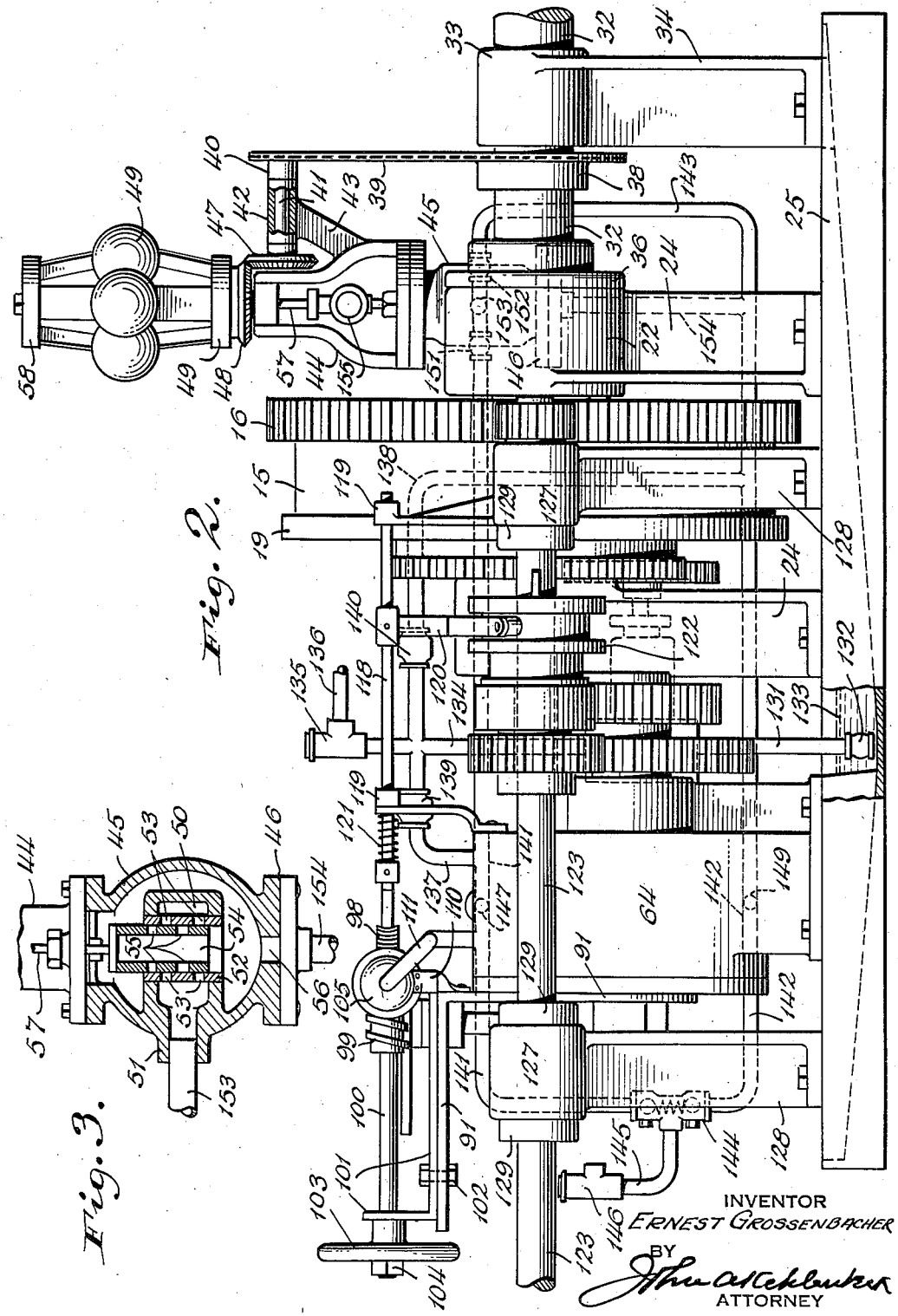

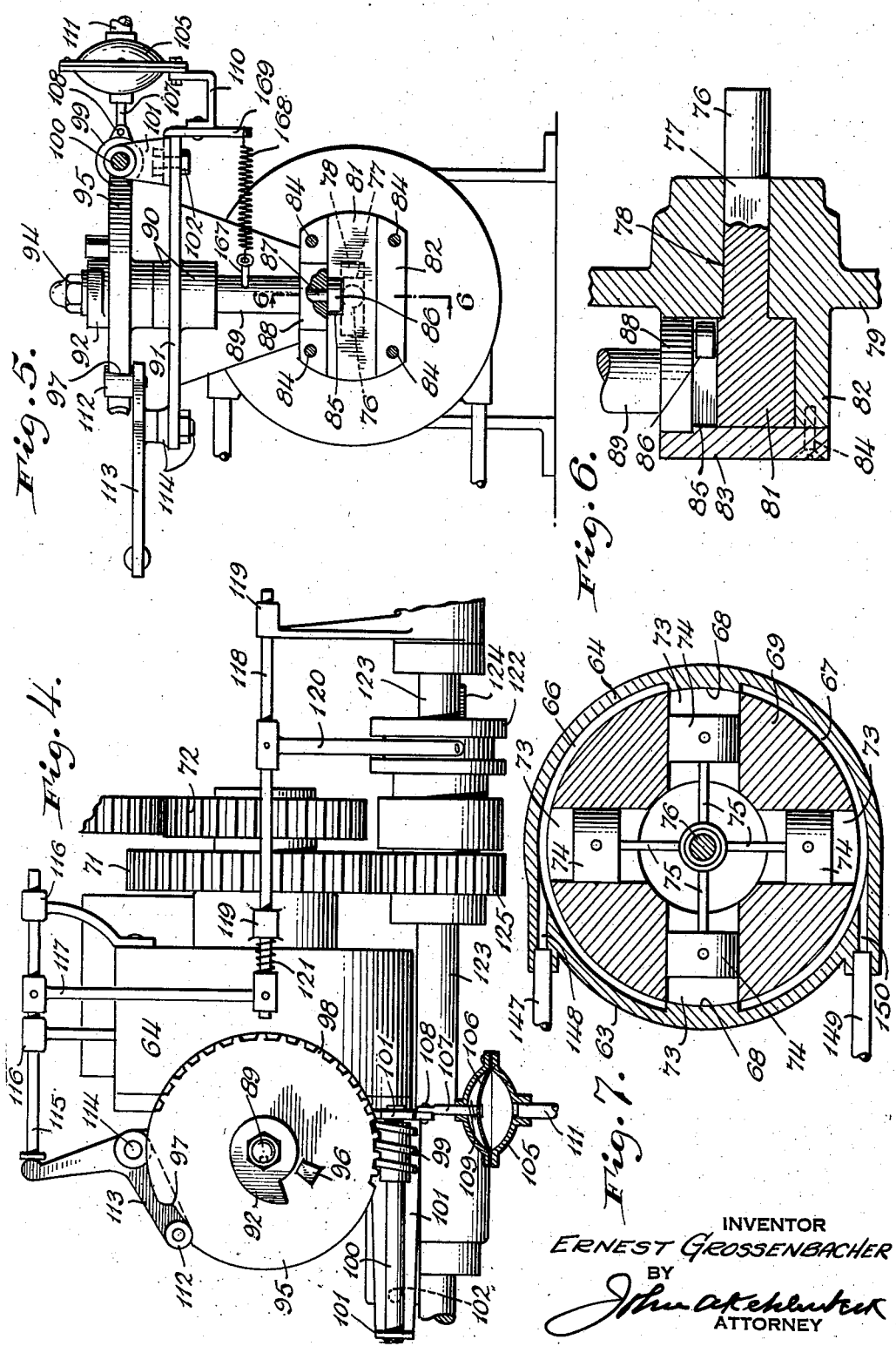

June 9, 1942. E. GROSSENBACHER 2,285,431
VARIABLE SPEED APPARATUS
Filed July 19, 1939 5 Sheets-Sheet 4
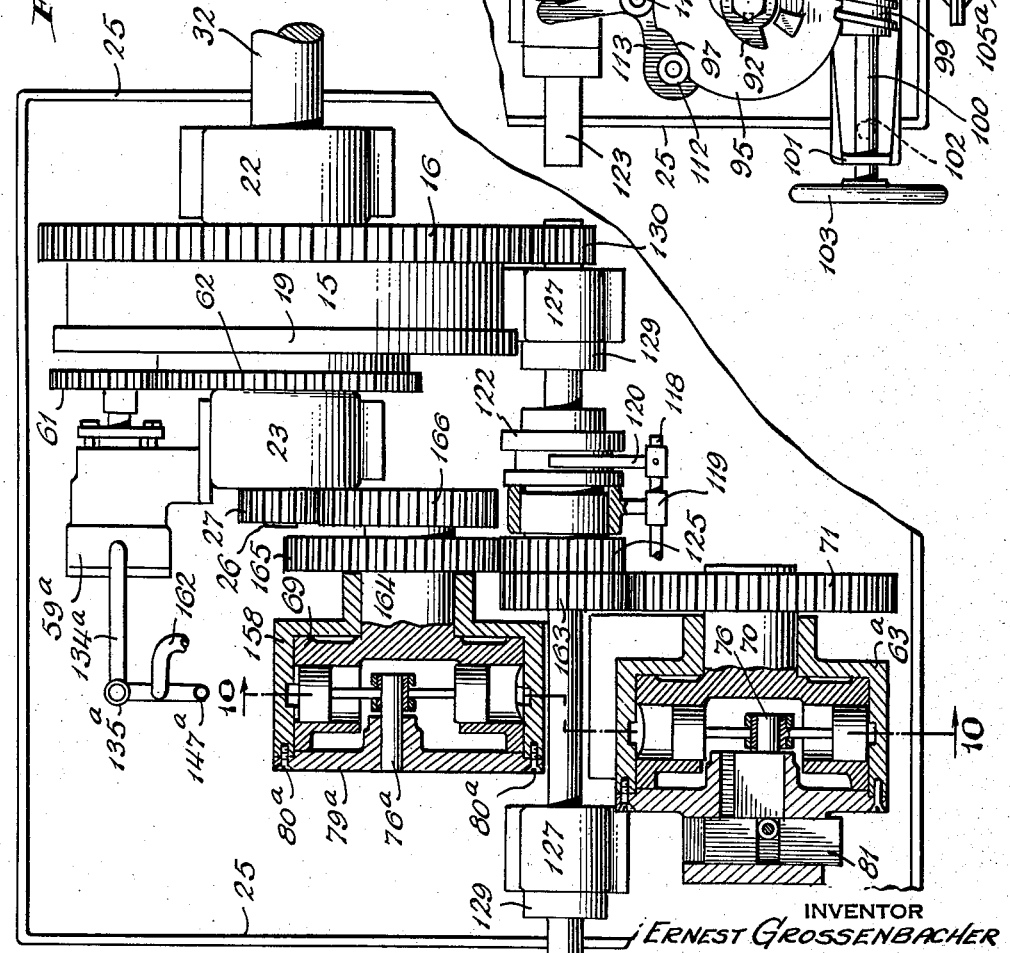
INVENTOR
ERNEST GROSSENBACHER
BY
ATTORNEY

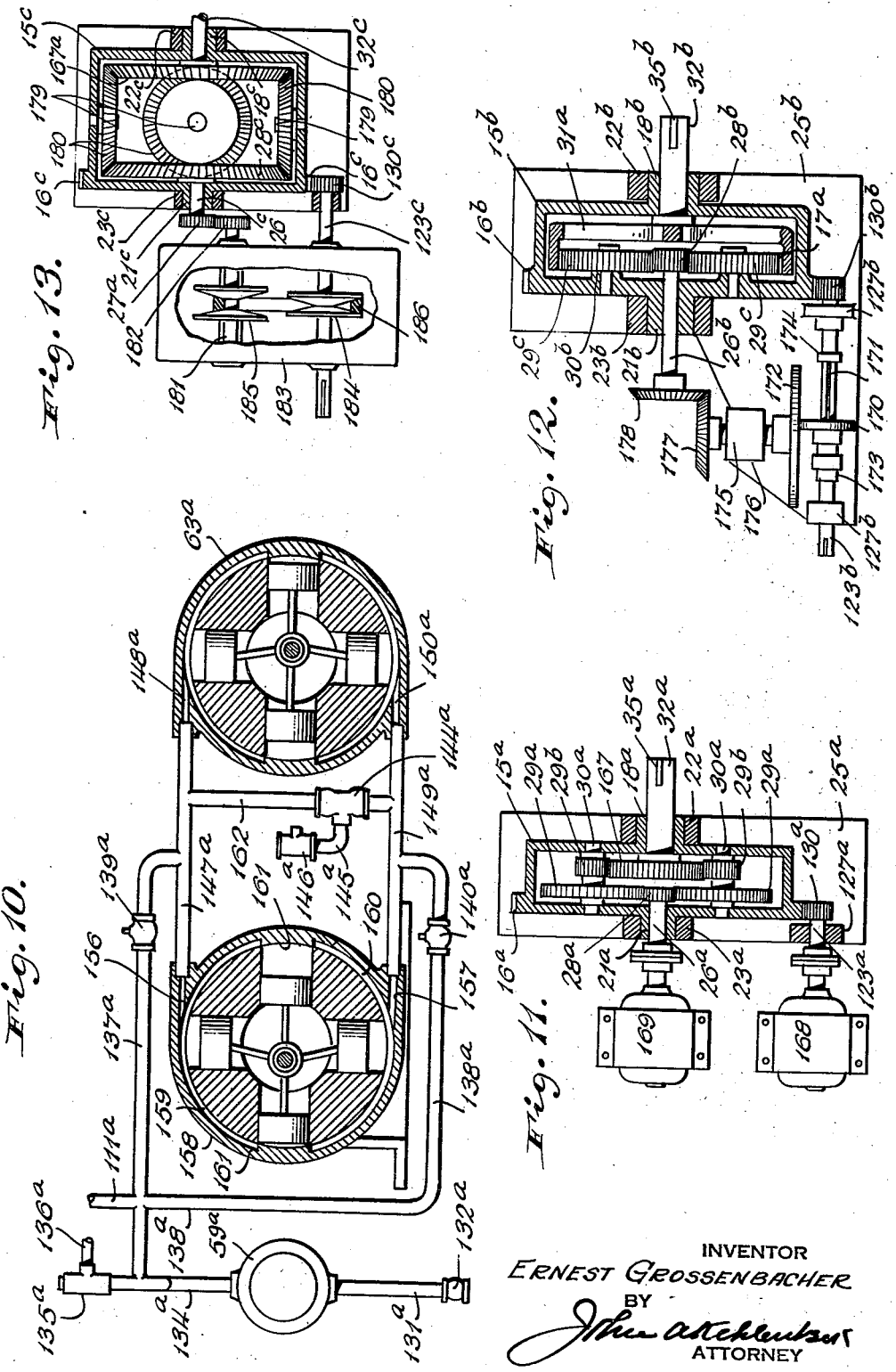

Patented June 9, 1942

2,285,431

UNITED STATES PATENT OFFICE 2,285,431

VARIABLE SPEED APPARATUS

Ernest Grossenbacher, Fajardo, P. R.

Application July 19, 1939, Serial No. 285,296

3 Claims. (Cl. 74—293)

The invention relates to variable speed apparatus and has for its object to provide an improved apparatus for transmitting operating power from a prime mover to an operated mechanism or machine. The invention contemplates further the provision of a variable speed apparatus whereby the output speed, for instance of an output shaft may be accurately maintained at any point between zero and maximum in a simple and reliable manner. Other more specific objects will appear from the description hereinafter and the features of novelty will be pointed out in the claims.

In the accompanying drawings, which illustrate examples of the invention without defining its limits, Fig. 1 is a plan view of the apparatus; Fig. 2 is a side elevation thereof; Fig. 3 is a detail section of a governor controlled valve included in the apparatus; Fig. 4 is a fragmentary plan view of a manually operated control; Fig. 5 is a detail end view looking from the left in Fig. 2; Fig. 6 is an enlarged detail section on the line 6—6 of Fig. 5; Fig. 7 is a detail section on the line 7—7 of Fig. 1; Fig. 8 is a sectional plan view of another form of the apparatus; Fig. 9 is a fragmentary plan view of the form shown in Fig. 8; Fig. 10 is a section on the line 10—10 of Fig. 8, and Figs. 11, 12, and 13 are views illustrating three additional forms of the apparatus respectively.

The apparatus shown in Figs. 1, 2, and 3 comprises a rotative speed starting and regulating device employing a planetary drive and hydraulic speed control consisting of a revolving multiple cylinder pump and speed governor.

The planetary drive comprises a gear housing 15 formed with an external annular gear 16 and an internal annular gear 17 with a tubular hub 18 projecting from the housing 15 in registry with the axis thereof as shown in Fig. 1. A cover plate 19 is removably secured to the housing 15 in any convenient manner as by screws 20, and includes a tubular bearing hub 21 projecting from said cover plate 19 in registry with the axis of the housing 15 as illustrated in Fig. 1. The housing 15 and its associated elements are rotatably mounted by means of the hubs 18 and 21 in bearing 22 and 23 carried by upright pedestals 24 which project upwardly from the base 25. The latter, in the illustrated example, is constructed in the form of a tray or receptacle for reasons to be set forth more fully hereinafter.

A speed regulating shaft 26 is journalled in and extends axially through the bearing hub 21 and at its outer end externally of the hub 21 carries a pinion 27, said shaft 26 at its inner end, interiorly of the housing 15 being provided with a sun pinion 28. The latter meshes with planet gears 29 which in turn mesh with the internal annular gear 17 and are rotatably mounted on studs 30 fixed upon and projecting from one face of a planet disc 31 located within the housing 15 as shown in Fig. 1. The planet disc 31 forms an integral part of or is fixed upon a low speed shaft 32 which is journalled in and projects outwardly beyond the tubular hub 18. The shaft 32 is further rotatably supported in and extends beyond a bearing 33 carried by an upright pedestal 34 projecting upwardly from the base 25, the projecting end of the shaft 32 being equipped with a keyway 35 or its equivalent for operative connection with associated mechanism or machines. The low speed shaft 32 is held against material axial displacement by a collar 36 fastened in place by a set-screw 37 in juxtaposition to the bearing 22, and a sprocket 38 carried by said shaft 32 in contiguous relation to the bearing 33.

The sprocket 38 is connected by means of a sprocket chain 39 with a sprocket pinion 40 fixed upon a shaft 41 journalled in a bearing 42 supported by a bracket 43 upon an upright frame 44. The latter is superimposed upon a valve casing 45 which in turn is fixed upon a bracket 46 comprising part of or secured to the bearing 22. The shaft 41 further is provided with a bevel pinion 47 in mesh with a co-operating bevel pinion 48 rotatably mounted on the frame 44 and carrying a speed governor 49 as illustrated in Fig. 2. The governor 49 is of the form of a conventional steam engine governor but with inverted valve motion. In other words, instead of closing the governor controlled valve as the speed increases, the illustrated governor 49 opens said valve.

As shown in Fig. 3, the valve casing 45 is formed with an internal chamber 50 having a port 51 and provided with a stationary tubular sleeve 52 fixed in place in any convenient manner and having ports 53 communicating with the chamber 50. A cylindrical tubular valve 54 open at its one end to the interior of the casing 45 is slidably fitted in the sleeve 52 and includes ports 55 co-operating with the previously mentioned ports 53 to control communication between the port 51 and a port 56 of the casing 45 in a manner for the purpose to be more fully set forth hereinafter. At its upper end the valve 54 is connected with a governor rod 57 which in turn is secured to the movable head 58 of the governor 49 and is slidably mounted in a suitable portion of the frame 44 as illustrated in Fig. 3. With this arrangement, the valve 54 is slidably operated in the sleeve 52 by the flyball action of the governor 49. In other words, while the governor 49 is at rest, the valve 54 occupies the raised position shown in Fig. 3 in which the ports 55 are out of registry with the ports 53 and communication between the casing ports 51 and 56 is consequently cut off. When the governor 49 revolves, the movable head 58 thereof will be moved downwardly by the flyball action of said governor and will correspondingly operate the governor rod 57 to thereby shift the valve 54 downwardly in the sleeve 52. As a result of this, the ports 55 will be adjusted into partial or complete registry with the ports 53 to thereby establish partially open or fully open communication between the casing ports 51 and 56. Variations in the extent to which the ports 55 are adjusted into registry with the ports 53 is dependent upon the speed at which the governor 49 rotates.

The apparatus being described further includes an auxiliary reversible rotary pump 59 mounted upon a bracket 60 fastened to the bearing 23 as shown in Fig. 1. The pump 59 is operated by means of a gear 61 fixed upon the pump shaft and meshing with an annular gear 62 carried by and constituting an integral part of the cover plate 19 attached to the housing 15.

In addition to the parts so far mentioned, the apparatus of Figs. 1 and 2 embodies a rotating cylinder variable displacement pump 63 mounted upon the base 25 and consisting of a cylindrical casing 64 which includes a tubular hub 65 projecting therefrom in registry with the axis of said casing 64 as illustrated in Fig. 1. On its interior circumferential surface the casing 64 is formed with internal grooves 66 and 67, the opposed ends of which are separated from each other by diametrically opposite partitions 68 as shown in Fig. 7. A cylindrical body 69 is rotatively mounted in the casing 64 with its circumferential surface in snug contact with the inner circumferential surface of the casing 64. The cylindrical body 69 is carried by and preferably forms an integral part of a shaft 70 journalled in and projecting outwardly beyond the tubular hub 65. The shaft 70 has fixed thereon the gears 71 and 72, the latter of which meshes with the pinion 27 on the shaft 26.

As illustrated in Fig. 7, the cylindrical body 69 of the variable displacement pump 63 is provided with four radially disposed cylinders 73 for the slidable accommodation of pistons 74. The latter are connected by means of connecting rods 75 with a movable pin 76 comprising part of means whereby the strokes of the pistons 74 are varied as will appear more fully hereinafter.

The cylindrical body 69 is formed with an axial bore into which the pin 76 projects from a block 77 slidable in a transverse slot 78 provided in a cover plate 79 which closes the front of the casing 64 and is removably fastened in place by screws 80. The block 77 is carried by and preferably comprises part of a stroke adjusting slide 81 adjustably mounted in a slotted boss or guide 82 projecting from the outer face of the cover plate 79. A plate 83 fastened to the boss or guide 82 by screws 84 maintains the slide 81 in place therein without interference with the adjustability of said slide 81 in said boss or guide 82, as shown in Fig. 1.

The stroke adjusting slide 81 is provided with a transverse rectangular slot 85 for slidably accommodating a shift member 86 mounted by means of a pin 87 upon the circular head 88 of a control shaft 89, said head 88 being rotatably fitted into the upper portion of the boss or guide 82 and contiguous portion of the plate 83 as illustrated in Figs. 5 and 6. The shaft 89 is further rotatably supported in a bearing 90 carried by a bracket 91 suitably mounted on the boss or guide 82, and at its upper end carries a cam 92 fixed on said shaft 89 by means of a key 93 and nut 94. A cam gear 95 is loosely mounted upon the shaft 89 in engagement with the bearing 90, so that said cam gear 95 is capable of rotating relatively to said shaft 89 and cam 92. A lug or projection 96 is carried by the cam gear 95 and extends from one face thereof for engagement with the cam 92 as will be more clearly set forth hereinafter. On its periphery the cam gear 95 is formed with a depressed cam 97, and further is provided throughout a portion of said periphery with worm gear teeth 98. The latter are in mesh with a worm screw 99 fixed upon a regulating shaft 100 rotatably supported in a bearing bracket or frame 101 which is pivotally connected by means of a bolt 102 with an extension of the bracket 91. An operating hand wheel 103 is mounted upon the outer ends of the shaft 100 and is fixed in place thereon by means of a nut 104. A diaphragm casing 105 is provided with an internal diaphragm 106 connected with a stem 107 which in turn is connected with the bearing frame 101 at 108 and carries a spring 109 bearing with one end against the casing 105 and with its other end against the diaphragm 106 as shown in Fig. 4. The diaphragm casing 105 is fixed in place by a bracket 110 suitably attached to the bracket 91 as illustrated in Fig. 5. A pipe 111 communicates with the diaphragm casing 105 and supplies the same with oil or its equivalent under pressure whereby the diaphragm 106 is operated against the tension of the spring 109 to normally maintain the worm screw 99 in mesh with the worm teeth 98 of the cam gear 95.

A roller 112 is normally located in the depressed cam 97 of the cam gear 95 and is rotatably mounted on one arm of a bell-crank lever 113 pivoted on a stud 114 fastened to the bracket 91. The other arm of the bell-crank lever 113 engages a clutch push rod 115 slidably mounted in stationary bearings 116 and coupled, by means of a connecting rod 117, to an auxiliary push rod 118 which is slidably supported in stationary bearings 119 and carries the clutch shifter 120. A spring 121 is located on the auxiliary push rod 118 between the connecting rod 117 and one of the bearings 119 as illustrated in Fig. 4 and serves normally to maintain the clutch 122 in its operative position. The clutch 122 is slidably mounted on the input or high speed shaft 123 and is held to rotate therewith by means of a key 124 or its equivalent. The clutch 122 serves, in its operative position to cause a pinion 125 which meshes with the gear 71 on the shaft 70 of the cylindrical body 69, to rotate with the input or high speed shaft 123, and in its inoperative position, to enable said shaft 123 to rotate independently of and relatively to said pinion 125, the latter being held against axial movement on the shaft 123 by the clutch 122 and a collar 126. The shaft 123 is journalled in bearings 127 supported by pedestals 128 mounted on the base 25 and is fixed against longitudinal displacement in said bearings 127 by collars 129 as shown in Fig. 1. A spur pinion 130 is fastened on the high speed shaft 123 to rotate therewith, and meshes with the external annular gear 16 of the housing 15 as illustrated in Figs. 1 and 2.

The suction side of the auxiliary pump 59 is in communcation with a pipe 131 provided at its lower end with a foot valve 132 located in the tray or receptacle 25 constituting the base of the apparatus, and submerged in the oil 133 or its equivalent located in said tray or receptacle 25 as shown in Fig. 2. A pipe 134 leads from the discharge side of said auxiliary pump 59 and terminates in a relief valve 135, the discharge port of which is connected by means of a pipe 136 with an oil tank (not shown) which serves the lubricating system of the apparatus. Branch connections 137 and 138 provided respectively with check valves 139 and 140 lead from the pipe 134 to upper and lower oil circulating pipes 141 and 142 respectively, the latter being connected with each other at one end by a pipe 143 and having their other ends in communication with a double check valve 144 which in turn is connected by means of a branch pipe 145 with a safety valve 146. A branch connection 147 leads from the upper pipe 141 to an upper port 148 of the variable displacement pump 63 and a similar branch connection 149 leads from the lower pipe 142 to a lower port 150 of said variable displacement pump 63. The ports 148 and 150 are in communication respectively with the internal grooves 66 and 67 of the pump casing 64 as shown in Fig. 7.

A three-way stop cock 151 and a straight-way cock 152 are located in spaced relation to each other in the upper oil circulating pipe 141, the latter being connected at a point between the cocks 151 and 152 with the port 51 of the governor valve casing 45 by means of a branch pipe 153 as illustrated in Fig. 1. The port 56 of the governor valve casing 45 in turn is connected by means of a pipe 154 with the lower oil circulating pipe 142.

In practice a prime mover such as an electric motor, is operatively connected in any convenient manner with the input or high speed shaft 123. When said prime mover is in operation the shaft 123 is actuated and rotative power is transmitted through the clutch 122, which is in its operative position, to the pinion 125 which in turn operates the large gear 71 and the smaller gear 72, both mounted on the shaft 70 of the variable displacement pump 63, to thereby operate said pump shaft 70. At the same time the smaller gear 72 will rotate the pinion 27 and its shaft 26 and correspondingly operate the suns pinion 28. The rotation of the input or high speed shaft 123 will also rotatively actuate the pinion 130 which accordingly transmits rotative motion to the external annular gear 16. This brings about a rotation of the housing 15 and with it the internal annular gear 17.

Since the gear ratio of gear train of gears 125—71—72—27—28, is equal to the gear ratio of gear 130—16—17 but in the opposite direction, the planetary gears 29 receive from both gear trains the same rotative speed and therefore simply revolve in a stationary position around the axes 30.

Although at this stage all gears revolve, the planetary gears 29 do not move in planet circle around sun pinion 28. Since this is the case, the axes 30 of the planetary gears 29 mounted to planet disc 31 and consequently the output shaft 32 remain in a locked position. By manually revolving the speed regulating wheel 103 and its shaft 100 and worm screw 99 which meshes with the worm teeth 98, to thereby turn the cam gear 95, the roller 112 passes out of the depressed cam 97. The bell-crank lever 113 is thereby pivotally actuated on the stud 114 and pushes the pushrod 115 and auxiliary pushrod 118 forward, to correspondingly shift the clutch shifter 120 in a manner to disengage the gear 125 from the clutch 122. At this stage, the lug or projection 96 on the cam gear 95 engages the cam 92 which is keyed to the shaft 89.

Since the pin 76 of the block 77 and stroke adjusting slide 81 up to this point has been concentrically located relatively to the cylindrical body 69 which at this stage is revolving in the casing 64 of the variable displacement pump 63, the connecting rods 75 have exerted no pumping action on the pistons 74. As the manual operation of the speed regulating wheel 103 is continued, the lug 96, by acting on the cam 92 will rotate the shaft 89 and thereby will cause the block 86 in co-operation with the slot 85 to shift the stroke adjusting slide 81 in the boss 82. The pin 76 will thereby be moved in a direction dependent upon the direction of operation of the wheel 103 away from its concentric position. When the pin 76 is thus shifted from its concentric position, and the cylindrical body 69 continues to revolve the pistons 74 start their pumping action and the displacement in the cylinders 73 increases with increase of the eccentricity of pin 76 relative to cylindrical body 69.

As the housing 15 is rotated by the pinion 130 acting on the external annular gear 16, the gear 62 will be correspondingly actuated and in turn will transmit movement to the gear 61 and thereby operate the auxiliary pump 59. The latter draws oil 133 or its equivalent from the base 25 upwardly through the pipe 131 and discharges said oil or its equivalent through the pipe 134 from which its passes through the pipes 137 and 138 and the check valves 139 and 140 to the upper and lower oil circulating pipes 141 and 142 respectively.

The three-way stop cock 151 in the upper pipe 141 serves to direct the oil either to the governor valve casing 45 or to permit it to circulate through straightway stop cock 152 down through pipe 143 to lower oil circulating pipe 142. At the branch connection 147 leading from the upper oil circulating pipe 141, the oil passes to and from (depending on direction of circulation) the upper half of variable displacement pump 64 and at the branch connection 149 from the lower pipe 142 to and from the lower half of pump 64. If the three-way cock 151 is so set that its passage is open to the governor valve casing 45, the oil passes through pipe 153. Both the upper and lower oil circulating pipes 141 and 142 are protected against excessive pressure by the safety valve 146. The double check valve 144 is designed to permit passage of the oil to the safety valve 146, by opening on the high pressure side and closing toward the low pressure side of the oil circulating system.

With all gears and associated movable parts in motion with the exception of the output shaft 32 and the thereto connected chain driven governor 49, the auxiliary pump 59 will pump the oil with sufficient pressure regulated by relief valve 135, throughout the circulating system and into the variable displacement pump 64 against the pressure created by the centrifugal force of the revolving cylindrical body 69 and expel the air along the cylinder and piston walls of said pump. The check valves 139 and 140 prevent high pressure oil from passing from the high pressure side to the low pressure side, it being understood since the apparatus is reversible, that either circulating pipe 141 and 142 may be under high pressure or low pressure. By further manipulation of the speed regulation wheel 103 and its associated mechanism, the variable displacement pump 64 forces oil against closed governor valve 54 whereby resistance is set up which retards the pumping speed. This resistance to rotation is transmitted by gear 72 to the pinion 27, the sun pinion shaft 26 and to the sun pinion 28. Since this resistance and consequent retardation upsets the speed equilibrium between sun gear 28 and internal annular gear 17, the planet gears 29 compensate this speed difference by rolling around sun pinion 28 in the retarded direction thereof. As planet gears 29 are rotatably mounted on the axes 30, which are fixed parts of the disc 31 which in turn is an integral part of or connected with the output or slow speed shaft 32, this shaft starts to rotate. The slower the sun pinion 28 revolves due to pump resistance, the faster the planet gears 29 travel around said sun pinion 28 and thereby increase the rotative speed of output shaft 32. As the sprocket 38 is fixed on the output shaft 32, the rotative motion of the latter is transmitted to the governor 49 by means of the endless chain 39 and sprocket 40.

The governor 49, built on the customary flyball governor principle, in operation pushes governor rod 57 and the thereto connected sleeve valve 54, downwardly so that the ports 55 in said sleeve valve 54 register more or less with ports 53 in valve sleeve 52. This allows oil to circulate from one side of pump 64 to the other, the resistance caused by the pumping action to rotation of revolving cylindrical body 69 being increased or decreased with the variation of the load or resistance to rotative motion of output shaft 32 and thereby effecting variation of speed which are responded to by the action of the flyball governor 49. If the output shaft 32 increases its speed, the governor 49 will increase the port openings and thereby reduce the resistance of pump 64 and allow the revolving cylindrical body 69 to rotate faster, thus increasing the speed of the sun pinion 28, which decreases the speed at which the planet gears 29 travel around it. Speed adjustments may be made by manipulating the knurled headed speed adjusting screw 155 which raises and lowers the valve stem 57 and sleeve valve 54 and brings the ports 55 and 53 more or less into correlation.

Since the action of the governor 49 depends entirely upon the speed of the output shaft 32, variations in the speed of the input shaft or high speed shaft 123 do not effect the speed of said output shaft 32. The action of governor 49 affects the resistance of revolving variable displacement pump 64 allowing it to increase its speed or decrease it in accordance with the force exerted upon the sun pinion 28 and its associated gears acting on the pump and the pumping resistance caused by the governor. In other words, when the governor speed increases due to increase of speed of the input shaft 147, the governor valve 54 will open and pass more oil through the revolving cylinder pump 64, thereby reducing the pump resistance and increasing the pump speed which in turn causes the sun pinion 28 to revolve faster. An increase in speed of the sun pinion 28 decreases the planetary speed of the planet gears 29 and thereby reduces the speed of the output shaft 32 to normal or to the speed to which the governor 49 has been adjusted. The same holds for a decrease in input speed only that the cycle of action is reversed. If it is desired to effect speed variations similar to those possible with the throttle of a steam engine or controller of an electric motor, the three-way stop cock 151 is set so that circulating oil passes directly through the straight-away stop cock 152 and through connecting pipe 143 from the pipe 141 to the pipe 142, or vice-versa. With the stop cock 151 in this position, the speed governor 49 becomes ineffective. Stop cock 152 is then partly closed so that the oil passage is restricted between the pipes 141 and 142. This restriction offers resistance to revolving cylinder displacement pump 64, which increases with increase of the pump stroke caused by turning of speed regulating wheel 103 and adjusting the therewith connected stroke adjusting slide 81. Any speed between zero and full output speed of shaft 32 may be obtained by properly manipulating the speed regulating wheel 103, as with this device a very heavy starting torque is possible due to infinitely small starting speeds which can be maintained, it being understood that the safety valve 146 has to be set to release at a predetermined pressure to prevent excessive high pressure when starting. At the same time this safety valve 146 acts as a protective device against over-loading of the prime mover.

In the form of the apparatus shown in Figs. 8, 9, and 10, the speed control is effected by a combination of a revolving cylinder constant displacement variable speed pump with a constant speed variable displacement pump of the type hereinbefore described in connection with Figs. 1 to 7 inclusive.

As illustrated in Fig. 10, the constant speed variable displacement pump 63ª is of the same general construction as the pump 63 of the form first described, and has its upper port 148ª and its lower port 150ª connected by means of oil circulating pipes 147ª and 149ª respectively, with the upper port 156 and lower port 157 of the variable speed constant displacement pump 158. The ports 156 and 157 lead respectively to internal grooves 159 and 160 provided on the interior circumferential surface of the casing of the pump 158 and having their opposed ends separated by diametrically opposite partitions 161. A relief pipe 162 extends between and connects the pipes 147ª and 149ª with each other, and itself is connected with opposite sides of a double check valve 144ª from which a branch pipe 145ª lead to a safety valve 146ª. Pipes 137ª and 138ª provided respectively with check valves 139ª and 140ª connect the respective pipes 147ª and 149ª with a pipe 134ª which leads to the discharge side of an auxiliary pump 59ª and is provided at its upper end with a relief valve 135ª, the discharge port of which is connected by means of a pipe 136ª with an oil tank (not shown) which, as in the first form, serves the lubricating system of the apparatus. A pipe 131ª communicates with the suction side of the auxiliary pump 59 and is provided at its lower end with a foot valve 132ª located, as in the first form, in the oil contained in the tray or receptacle 25 which constitutes the base of the apparatus. The pipes 137ª and 138ª through the medium of a pipe 111ª also communicate with a diaphragm casing 105ª provided interiorly with a spring and diaphragm similar to that of the casing 105; a stem 107 connects the diaphragm of the casing 105ᵃ at 108 with the bearing frame 101 as in the form first described.

As shown in Figs. 8 and 9, the constant speed variable displacement pump 63ᵃ has mounted on its shaft 70 the gear 71 which meshes with a pinion 163 fixed on the high speed or input shaft 123. The constant displacement pump 158 has mounted on its shaft 164 the gear 165 meshing with the clutch pinion 125 and also carries the gear 166 meshing with the external pinion 27 of the speed regulating shaft 26. Constant displacement pump 158 has a fixed pin 76ᵃ supported by the cover 79ᵃ, the latter being fastened in place by screws 80ᵃ to the casing of the pump 158. Both pumps 158 and 63ᵃ are identical in construction with each other and with the pump 63 of the first form, with the exception that the stroke or piston travel of the pump 158 is fixed i. e., the pin 76ᵃ is fixed eccentrically relatively to the revolving cylinder body 69 so that with every turn of the latter the same amount of oil is transferred and displaced from one half of the pump body to the other. The high speed or input shaft 123 to which the pinion 163 is rigidly keyed, transmits motion to the variable displacement pump 63ᵃ through the gear 71. Clutch pinion 125 when operatively connected with the clutch 122 transmits motion through the gear 165 to the constant displacement pump 158. The pumps 158 and 63ᵃ are so arranged that the pin 76ᵃ of the constant displacement pump 158 and the pin 76 of the stroke adjusting slide 81, of variable displacement pump 63ᵃ have the same eccentricity relatively to the revolving cylindrical bodies 69 and revolve at the same speed. Also their rotation is such that the same amount of oil is displaced by each pump so that whatever amount of oil leaves pump 158 and flows through the pipe 147ᵃ is received by pump 63ᵃ, and also that all the oil that leaves pump 63ᵃ will be received by the pump 158 through the pipe 149ᵃ. Therefore, a completely closed oil circulating system exists between the two pumps 158 and 63ᵃ. Auxiliary pump 59ᵃ supplies oil to this system which is under sufficient pressure to fill pumps 158 and 63ᵃ, and also compresses the spring of the diaphragm on the diaphragm casing 105ᵃ. To the shaft 89 of the stroke adjusting means is fastened a rod 167 to which is attached one end of a spring 168 which is fastened at its other end to a stationary stud 169, said spring 168 serving at the proper time, to pull stroke adjusting slide 81 into full stroke position.

The planetary drive and associated elements with which the speed varying device under discussion is connected, are the same as described in connection with the first form of the novel arrangement.

In operation the high speed or input shaft 123 in the apparatus shown in Figs. 8, 9, and 10, receives rotative speed from the prime mover which in this case is of constant speed and transmits this speed through the pinion 163 to the gear 71 mounted on the shaft 70 of the variable displacement pump 63ᵃ. The clutch pinion 125 transmits its speed to the gear 165 mounted on the shaft 164 of the constant displacement pump 158. The pumps 63ᵃ and 158 both operate at the same speed. The pinion 130 transmits its rotative speed to the external annular gear 16 and over the gear 62 to the auxiliary pump 59ᵃ which draws oil from the base 25 and discharges it through the priming pipes 134ᵃ, 137ᵃ and 138ᵃ into the revolving pumps. The pressure of the oil acts on the diaphragm 106 and compresses the spring 109 and at the same time pushes the stem 107 outward. The stem 107 is connected to the worm bearing 101 which pivots on the bolt 102 and thereby engages worm screw 99 with the worm gear teeth 98 of cam gear 95.

Since the pumps 158 and 63ᵃ have the same ratio, due to even speed and even displacement, there exists very little resistance in driving them and as the clutch 122 is connected with the pinion 125, the gears 165 and 166 and the pinion 27 on the speed regulating shaft 26 are all rotated so that all members revolve, except the output shaft 32, which for reasons previously explained, remains stationary as long as the clutch 122 is in its operative position.

By turning the speed regulating wheel 103 the clutch gear 125 becomes disengaged from clutch 122 which is rigidly mounted on the high speed shaft 123. By further turning of speed regulating wheel 103 in the previously described manner, stroke adjusting slide 81 with the pin 76 set fully eccentric to revolving cylindrical body 69 is shifted towards the center of said body 69, thereby reducing the strokes of the pistons 74 and with it the displacement. The reduced displacement causes an increased pressure in the suction line of the variable displacement pump 63ᵃ and also in the discharge side of the constant displacement pump 158. The speed of the constant displacement pump 158 is reduced in proportion with the amount of oil the variable displacement pump passes due to its reduced piston displacement at full speed. This displacement can be reduced to zero although the pump revolves at full speed, whereby the constant displacement pump 158 is brought to a full stop. It is, therefore, evident that the speed of constant displacement pump 158 depends entirely upon the piston travel of variable displacement pump 63ᵃ. This variation of speed of the revolving cylindrical body 69 caused by variation of oil flow to and from the pump 158 effects the rotative speed of the gear 166 mounted on the pump shaft 164 of the constant displacement pump 158 and meshing with the gear 27 of the speed regulating shaft 26 and sun pinion 28, which by variation of rotative speed varies the circular speed of the planet gears 29 and the thereto connected output shaft 32, as previously described with respect to the first form of the apparatus.

If the prime mover is stopped while the speed regulator is set at same fixed speed, the apparatus will automatically rest itself so that when the prime mover is brought up to full speed, the output shaft 32 can not revolve until brought up to the desired speed by manual adjustment of the speed regulating wheel 103. As soon as the machine is brought to a stop, the oil pressure effecting the diaphragm 106 ceases with the pumping action of auxiliary pump 59ᵃ. The diaphragm spring 109 then pushes the diaphragm 106 in opposition to the oil and pulls with it diaphragm stem 107 connected to the worm bearing 101 and thereby disengages the worm 99 from the worm gear teeth 98. In order to reduce the piston displacement of pump 63ᵃ, the shaft 89 is rotated and with it the rod 167 to which the spring 168 is attached under tension against spring stud 169. When the worm screw 99 is disengaged from worm gear teeth 98 of the cam gear 95, the spring 168 pulling on the rod 167 turns the shaft 89 and with this motion returns stroke adjusting slide 81 and the pin 76 around which the connecting rod 75 revolve to full stroke position, thereby returning pump 63ᵃ to full displacement. In this position ball bearing roller 112 rolls into the low position of cam 97, and at the same time the bell-crank lever 113, the clutch pushrod 115 and clutch shifter 120 are forced backward by the spring 121, thereby engaging the pinion 121 with the clutch 122.

In the form of the apparatus first described herein, a variable displacement pump discharges against a governor or through a partly closed stop cock and starts its pumping action from zero or no displacement to full displacement, whereas in the second form the constant displacement pump and the variable displacement pump start to work with full displacement. In the first case, operation of the output shaft begins with increased pumping action while in the second case, it increases with reduced pumping action.

In Figs. 11, 12, and 13, I have shown three different types of novel gear drives which may be utilized. As illustrated in Fig. 11 the gear drive consists of a hollow casing 15a provided with an external annular gear 16a, and including tubular hubs 18a and 21a which project in opposite directions from said casing 15a in registry with the axis thereof. The hubs 18a and 21a are rotatably supported respectively in bearings 22a and 23a mounted on the base 25a in any convenient manner. Intermediate gears 29a are carried interiorly of the casing 15a on shafts 30a suitably mounted in said casing, said shafts 30a further carrying intermediate pinions 29b. The intermediate gears 29a mesh with a pinion 28a fixed upon a shaft 26a which is rotatable in the bearing hub 21a and projects outwardly beyond the same, and the intermediate pinions 29b mesh with a pinion gear 167 secured upon the output shaft 32a rotatable in the bearing hub 18a and extending outwardly beyond the same. At its outer end the output shaft 32a is provided with a keyway 35a or equivalent coupling means. The external annular gear 16a of the casing 15a meshes with a pinion 130a carried by a shaft 123a rotatable in a bearing 127a suitably supported on the base 25a.

Either of the shafts 26a or 123a may be used as the input shaft or speed regulating shaft respectively; for descriptive purposes it will be assumed the shaft 123a is the power input shaft, and that the shaft 26a is the speed regulating shaft. Under such conditions an electric motor 168 is coupled to the shaft 123a, and a convertible motor-generator 169 is connected with the shaft 26a.

In operation, both the motor 168 and the motor-generator 169 are started simultaneously and operated at speeds correlated with the gear ratios to provide an operating balance. When this balance exists, the pinion 130a meshing with the external annular gear 16a, revolves the hollow casing 15a which carries with it the pinions 29b around the gear 167. As the pinions 29b and gears 29a are mounted in pairs upon the shafts 30a, the gears 29a will impart rotative motion to the pinion 28a. Since the speed of the motor-generator 169 is assumed to be correlated with the gear ratios, all revolving members of the apparatus are in motion, except the gear 167 and the output shaft 32a. However, as the speed of the motor-generator 169 is reduced by means of dynamic braking, the rotative speed of the gears 29a and the pinions 29b is reduced, and since the rotative speed of the casing 15a is maintained the gear 167 and shaft 32a are rotated. With the motor 168 operating at constant speed the rotative speed of the output shaft 32a increases with a decrease in the speed of the motor-generator 169 and decreases with an increase in the speed of the latter.

The novel gear arrangement shown in Fig. 12 may also be employed in effecting variable rotative speeds. In this type of drive, the hollow casing 15b carrying gears 29c rotatable on axes 30b and meshing with the internal annular gear 17a provided on a recessed support 31a located within the casing 15b, is equipped with tubular hubs 18b and 21b and with an external annular gear 16b. The casing 15b rotates freely in bearings 22b and 23b which are suitably mounted on the base 25b. A high speed drive or input shaft 123b is journaled in bearings 127b which also are supported on the base 25b in any convenient manner. On one end of the drive or input shaft 123b a pinion 130b is rigidly mounted and meshes with the external annular gear 16b, said drive shaft 123b also constituting part of a friction disc drive consisting of movable friction wheel 170, which is slidably mounted on said high speed or drive shaft 123b, for instance, by means of a keyway 171 or the like. The friction wheel 170 is adjustable to any position on a friction disc 172 between stop rings 173 and 174 which are rigidly fastened on the drive shaft 123b.

The friction disc 172 which rotates at right angles to the friction wheel 170 is fixed on a shaft 175 rotatable in a stationary bearing 176 suitably mounted on the base 25b. On the extreme end of the shaft 175 is rigidly mounted a bevel gear 177 which meshes with a bevel gear 178 mounted on the speed regulating shaft 26b. The latter extends through and is rotatable in the tubular hub 21b of the casing 15b and carries on its inner end the pinion 28b which meshes with the gears 29c. The output, or in this case slow speed shaft 32b, forms part of the recessed support 31a carrying the internal annular gear 17a which meshes with the gears 29c. The shaft 32b projects through and is rotatable in the tubular hub 18b and carries on its outer end a keyway 35b or its equivalent.

In operation, in order to effect zero speed or complete stop of the output shaft 32b, the gear ratio and respective friction disc and friction wheel ratio must be such that gears 29c revolve inside of internal annular gear 17a. This is accomplished by revolving pinion 28b at such a speed that the gears 29c do not develop any tooth pressure on the internal annular gear 17a. The friction wheel 170 is set close to the center of the friction disc 172 thereby imparting to the latter the required high speed. In other words, the high speed or power input shaft 123b, on which the friction wheel 170 is so mounted that it revolves with the shaft but may be axially shifted on this shaft 123b between the stop rings 173 and 174, imparts rotative motion of the correct speed by means of the friction wheel 170 and the friction disc 172 and through shaft 175 and bevel gears 177 and 178 to the speed regulating shaft 26b and pinion 28b. The high speed or power input shaft 123b also carries pinion 130b which meshes with and revolves the external annular gear ring 16b of the hollow casing 15b.

This casing 15b carries the rotatable gears 29c which revolve at correlative speed with center pinion 28b so that the internal gear 17a and the output shaft 32b remain stationary. By shifting the friction wheel 170 along the high speed or input shaft 123b towards the stop ring 174, the contact diameter on the surface of the friction disc 172 is increased and the rotative speed of the latter decreased. As this is done and as the pinion 28ᵇ is directly connected with the friction disc 172 by means of the shaft 175, the bevel gears 177 and 178, and the speed regulating shaft 26ᵇ, the speed ratio between the hollow casing 15ᵇ carrying the gears 29ᶜ and the internal annular gear 17ᵃ and the pinion 28ᵇ is changed.

The internal annular gear 17ᵃ and the thereto connected output shaft 32ᵇ compensate for this difference in ratio and start to revolve. The closer the friction wheel 170 is brought to the stop 174, the larger the contact diameter and the slower the friction disc 172 will revolve, which in turn will cause the output shaft 32ᵇ to rotate faster. When however the friction wheel 170 is brought near the center of the friction disc 172, a point will be reached where the output shaft 32ᵇ will stop rotating and where it will be in absolute non-rotatable or locked position.

In Fig. 13 is shown a differential gear arrangement connected to an infinitely variable speed control. In this combination the input shaft 123ᶜ of the variable speed control is connected at its outside end to a suitable prime mover, while at the other end it carries a pinion 130ᶜ; the latter meshes with an external annular gear 16ᶜ forming an integral part of the gear casing 15ᶜ which further is equipped with tubular central hubs 18ᶜ and 21ᶜ, arranged to revolve in bearings 22ᶜ and 23ᶜ suitably supported on the base 25ᶜ. In the casing 15ᶜ are internally mounted the shafts or axes 179 on which revolve the bevel gears 180. The speed regulating shaft 26ᶜ which rotates in and passes through the tubular hub 21ᶜ on the gear casing 15ᶜ, carries on its externally projecting portion a gear 27ᵃ and on its inner end within the casing 15ᶜ is provided with a bevel gear 28ᶜ meshing with the bevel pinions 180. The output shaft 32ᶜ passes through and is rotatable in the tubular hub 18ᶜ of the gear casing 15ᶜ and carries on its inner end within the latter the bevel gear 167ᵃ which also meshes with the bevel pinions 180. The shaft 181 of the variable speed reducing device, which normally is considered as the output shaft carries the gear 182 in mesh with the gear 27ᵃ of the speed regulating shaft 26ᶜ.

The speed change unit illustrated in Fig. 13, consists of a box or frame 183 which rotatably supports the shafts 123ᶜ and 181 on each of which are mounted a pair of opposite conical wheels 184 and 185 between which a wedge shaped belt or chain 186 transmits power. The effective diameters of each pair of wheels can be altered under load to change the speed ratio, without steps. On changing the speed, the chain or belt 186 rises between wheels 185 and descends between the wheels 184, so that while the input shaft 123ᶜ connected to a suitable prime mover rotates at constant speed, the output shaft 181 changes its speed in accordance with the adjustment of the belt or chain 186 on the wheels 184 and 185. It will be understood that suitable means is provided for effecting the aforesaid adjustment of said belt or chain 186. By means of the gear 182 mounted to the output shaft 181 of the variable speed change unit, and gear 27ᵃ mounted to the speed regulating shaft 26ᶜ, a ratio is established whereby if belt or chain 186 travels on the smallest diameters between the conical wheels 185 and the largest diameters between the conical wheels 184, the casing 15ᶜ and the internal gear 28ᶜ rotate at such a speed that bevel gear 167ᵃ and output shaft 32ᶜ remain stationary.

When the speed ratio of the variable speed change unit is changed by altering the diameter of contact of the belt or chain 186 between the conical wheels 184 and 185, the output shaft 181 of the variable speed change unit revolves at a lower speed, thereby retarding the speed of gears 182 and 27ᵃ and also of shaft 26ᶜ and bevel gear 28ᶜ. In compensation for th difference is gear ratio, the gear 167ᵃ and output shaft 32ᶜ begin to revolve. The slower the speed of the output shaft 181 of the speed change unit, the higher the speed of the variable speed starting and regulating drive.

It is therefore evident that with the positive variable speed transmission gear the speed regulation is limited between predetermined high and low limits and in which case no zero speed or total stop can be obtained while the prime mover is in operation.

However, by coupling any of the herein described gear arrangements to the above described variable speed transmission gear, it is possible to bring about zero speed and a locked output shaft.

It is understood that any of the herein mentioned gear devices may be used in connection with any of the regulating devices described.

Basically the apparatus in all of its forms consists of an input shaft, an output shaft and a speed regulating shaft, any of the three shafts may take the place of any of the other two, depending upon whether an increase or decrease over the prime mover's speed is required.

The three shafts are rotatively connected by means of gears in such a way tha the rotative speed of any two shafts influences the speed of the third shaft.

The speed variation may be obtained by means of two hydraulic controls consisting either of a revolving cylinder variable displacement pump connected to a speed governor as in Figs. 1 and 2, or a combination of revolving cylinder variable speed constant displacement and variable displacement constant speed pump as in Figs. 8 and 9. The desired results according to the invention may also be obtained by means of a motor generator set consisting of two separately coupled units as in Fig. 11, a friction disc transmission as in Fig. 12, or by combination with a positive infinitely variable speed regulating device as in Fig. 13.

Any suitable type of prime mover such as an electric motor, a steam turbine, an internal combustion engine, a wind mill, a wind rotor, a water wheel, or a Pelton wheel may be used in combination with the novel apparatus.

If the input shaft thereof is connected to a prime mover such as an electric motor, a steam turbine or a steam engine, which operates at constant speed, the output shaft may be operated and held at any speed between zero and the maximum output speed of the apparatus.

If the input shaft of this apparatus is connected to a prime mover such as a wind mill or a wind rotor, whose speed varies, the output shaft may be maintained at constant speed or may be varied between zero and the maximum output speed possible.

The prime mover such as an electric motor or steam turbine, directly connected to the input shaft of the apparatus may be brought up to full operating speed, while the output shaft of the apparatus is at rest or zero speed, and said shaft may be brought up to any speed and be held at any rotative speed up to full output speed of the output shaft.

While the input shaft is rotating or is stopped, the output shaft, if not rotating, is held in a locked, stationary position so that it can not be rotated, and acts therefore as a positive brake to the output shaft and to the thereto connected working machine or rotative device.

Various changes in the specific forms shown and described may be made within the scope of the claims without departing from the spirit of the invention.

I claim:

1. In a variable speed apparatus, the combination of a planetary drive, an output shaft operatively controlled by said planetary drive, a speed regulating shaft operatively connected with said planetary drive, a speed variable displacement pump operatively connected with said speed regulating shaft, an oil circuit connected with said pump, an auxiliary pump connected with a source of oil supply and with said oil circuit for supplying oil thereto, said auxiliary pump being operatively connected with said planetary drive, an input shaft adapted for operative connection with a prime mover, and operatively connected with said planetary drive, gearing including a clutch pinion loosely mounted on said input shaft whereby the latter may be operatively connected with said speed variable displacement pump, a clutch whereby said clutch pinion is operatively connected with and disconnected from said input shaft, a control shaft, a cam gear loosely mounted on said last-named shaft and including worm gear teeth on a portion of its periphery and a depressed cam at another portion thereof, a bell crank lever, a roller carried by said bell crank lever in rolling engagement with the periphery of said cam gear in co-operative relation to said depressed cam, means controlled by said bell crank lever for operating said clutch to connect and disconnect the clutch pinion with and from said input shaft, a cam fixed on said control shaft, a lug projecting from the face of said cam gear in the path of said cam for operating said cam gear, a regulating shaft having a worm screw arranged to mesh with the worm gear teeth of said cam gear, an operating hand wheel fixed on said worm shaft, a pivotally mounted bearing bracket for said regulating shaft, means including an oil pressure controlled diaphragm for pivotally adjusting said bearing bracket to shift the worm screw into and out of mesh with the worm gear teeth of said cam gear, a stroke adjusting slide operatively connected with said control shaft for adjusting the displacement of said variable displacement pump to thereby control the operation of said planetary drive and the output shaft, a governor operatively connected with said output shaft, a governor valve in said oil circuit controlled by said governor and operated thereby in dependence upon the speed of said output shaft to develop and control resistance to the action of the variable displacement pump whereby the operation of the output shaft is controlled independently of variations in the speed of the input shaft, a three-way stop cock in the oil circuit for selectively directing the oil therein to said governor valve or through the circuit, and a two-way stop cock for controlling the flow through the circuit.

2. In a variable speed apparatus, the combination of a planetary drive, an output shaft operatively controlled by said planetary drive, a speed regulating shaft operatively connected with said planetary drive, a speed variable displacement pump operatively connected with said speed regulating shaft, an oil circuit connected with said pump, an auxiliary pump connected with a source of oil supply and with said oil circuit for supplying oil thereto, said auxiliary pump being operatively connected with said planetary drive, an input shaft adapted for operative connection with a prime mover, and operatively connected with said planetary drive, gearing including a clutch pinion loosely mounted on said input shaft whereby the latter may be operatively connected with said speed variable displacement pump, a clutch whereby said clutch pinion is operatively connected with and disconnected from said input shaft, a control shaft, a cam gear loosely mounted on said last-named shaft and including worm gear teeth on a portion of its periphery and a depressed cam at another portion thereof, a bell crank lever, a roller carried by said bell crank lever in rolling engagement with the periphery of said cam gear in co-operative relation to said depressed cam, means controlled by said bell crank lever for operating said clutch to connect and disconnect the clutch pinion with and from said input shaft, a cam fixed on said control shaft, a lug projecting from the face of said cam gear in the path of said cam for operating said cam gear, a regulating shaft having a worm screw arranged to mesh with the worm gear teeth of said cam gear, an operating hand wheel fixed on said worm shaft, a pivotally mounted bearing bracket for said regulating shaft, means including an oil pressure controlled diaphragm for pivotally adjusting said bearing bracket to shift the worm screw into and out of mesh with the worm gear teeth of said cam gear, a stroke adjusting slide operatively connected with said control shaft for adjusting the displacement of said variable displacement pump to thereby control the operation of said planetary drive and the output shaft, a governor operatively connected with said output shaft, and a governor valve in said circuit controlled by said governor and operated thereby in dependence upon the speed of said output shaft to develop and control resistance to the action of said variable displacement pump whereby the output shaft is controlled independently of variations in the speed of the input shaft.

3. In a variable speed apparatus, the combination of a planetary drive, an output shaft operatively controlled by said planetary drive, a speed regulating shaft operatively connected with said planetary drive, a speed variable displacement pump operatively connected with said speed regulating shaft, an oil circuit connected with said pump, an auxiliary pump connected with a source of oil supply and with said oil circuit for supplying oil thereto, said auxiliary pump being operatively connected with said planetary drive, an input shaft adapted for operative connection with a prime mover, and operatively connected with said planetary drive, gearing including a clutch pinion loosely mounted on said input shaft whereby the latter may be operatively connected with said speed variable displacement pump, a clutch whereby said clutch pinion is operatively connected with and disconnected from said input shaft, a control shaft, a cam gear loosely mounted on said last-named shaft and including worm gear teeth on a portion of its periphery and a depressed cam at another portion thereof, a bell crank lever, a roller carried by said bell crank lever in rolling engagement with the periphery of said cam gear in co-operative relation to said depressed cam, means controlled by said bell crank lever for operating said cluch to connect and disconnect the clutch pinion with and from said input shaft, a cam fixed on said control shaft, a lug projecting from the face of said cam gear in the path of said cam for operating said cam gear, a regulating shaft having a worm screw arranged to mesh with the worm gear teeth of said cam gear, an operating hand wheel fixed on said worm shaft, a pivotally mounted bearing bracket for said regulating shaft, means including an oil pressure controlled diaphragm for pivotally adjusting said bearing bracket to shift the worm screw into and out of mesh with the worm gear teeth of said cam gear, a stroke adjusting slide operatively connected with said control shaft for adjusting the displacement of said variable displacement pump to thereby control the operation of said planetary drive and the output shaft, and a governor controlled valve in said circuit operated in dependence upon the speed of said output shaft to control the latter independently of variations in the speed of the input shaft.

ERNEST GROSSENBACHER.